US005297695A

United States Patent [19]

Provence

[11] Patent Number: 5,297,695

[45] Date of Patent: Mar. 29, 1994

[54] PAINTBRUSH WIPER AND APPARATUS HOLDER

[76] Inventor: Jeffrey Provence, 2302 Via Dieguenos, Alpine, Calif. 91901

[21] Appl. No.: 83,881

[22] Filed: Jun. 24, 1993

[51] Int. Cl.[5] .............. B01D 35/28

[52] U.S. Cl. .............. 220/697; 220/23.83; 220/695

[58] Field of Search .............. 220/697, 695, 700, 701, 220/23.87, 23.86

[56] References Cited

U.S. PATENT DOCUMENTS

| | | | |
|---|---|---|---|
| D. 300,970 | 5/1989 | Walker . | |
| D. 305,820 | 1/1990 | Beato . | |
| 768,364 | 8/1904 | Hines | 220/23.83 X |
| 2,314,835 | 3/1943 | Johns et al. | 220/23.83 X |
| 2,606,689 | 8/1952 | Kistner | 220/695 X |
| 2,715,478 | 8/1955 | Anderson . | |
| 2,748,977 | 6/1956 | Sanchet | 220/697 |
| 2,919,828 | 1/1960 | Lemke | 220/700 |
| 3,133,668 | 5/1964 | Heise | 220/90 |
| 3,407,429 | 10/1968 | Di Nardo | 15/257 |
| 3,688,943 | 9/1972 | Brown | 220/90 |
| 4,164,299 | 8/1979 | Fuhr | 220/697 X |
| 4,203,537 | 5/1980 | McAlister | 222/570 |
| 4,247,013 | 1/1981 | O'Hori | 220/90 |
| 4,275,818 | 6/1981 | Church | 220/697 |
| 4,353,476 | 10/1982 | Cowgill | 220/85 D |
| 4,436,217 | 3/1984 | Ritter | 220/85 D |
| 4,583,666 | 4/1986 | Buck | 222/109 |
| 5,207,348 | 5/1993 | Fischer et al. | 220/697 |

*Primary Examiner*—Steven M. Pollard

[57] ABSTRACT

The specification discloses a removable paintbrush wiper and apparatus holder which can be mounted on the inner rim and outer surface of a conventional paint can. Two outwardly projecting tangs (12L and 12R) supported by a pair of angled arms (20L and 20R), hold the device to a paint can. An elevated primary wiping surface (14) is used to unload excess paint on a paintbrush. Two secondary wiping surfaces (16L and 16R) at right angles in respect the the elevated wiping surface (14) are used to wipe excess paint of the sides of a paintbrush. A vertical surface dam (18) is used to divert subsequent paint residue, caused by the wiping action on the primary wiping surface (14), to flow back into the can. There is also a location for placing painting apparatuses called the apparatus holder (26) open at the top surface and closed on the sides and bottom. The apparatus holder (26) can also be used for soaking a paintbrush after usage.

6 Claims, 5 Drawing Sheets

PAINTBRUSH WIPER AND APPARATUS HOLDER

BACKGROUND—FIELD OF INVENTION

This invention relates to painting, specifically to a combination paintbrush wiper and apparatus holder for paint cans.

BACKGROUND—DESCRIPTION OF PRIOR ART

Painting has typically been a very messy job. The design of the conventional paint can is not designed to allow the painter to unload excess paint off the brush. Wiping the brush on the side of the paint can causes several problems. This action causes paint to flow into the rim channel and over the side of the paint can. The paint often ends up on the carpet or other surface where the can is placed. Once the rim of the can has been contaminated with paint, it is very difficult to seal the can properly. The paint in the rim also acts like cement making the subsequent opening of the can very difficult.

Another problem arises when the painter puts the lid back on the can with the rim section full of paint. When the painter strikes the lid to seal the can, the paint in the rim is projected outward and can cause substantial damage to the surrounding area. The paint is often projected onto the painter, and can cause physical damage if expelled into the eyes.

Furthermore, the conventional paint can does not have a suitable place for the painter to put painting accessories when he or she is not using them. The paintbrush or stir stick is often placed across the top of the paint can when not in use. Paint runs off the brush or stir stick into the rim channel and over the edge of the paint can.

Moreover, the curvilinear edge of the inner rim of the paint can does not provide a suitable surface for removing excess paint from a paintbrush. Paint is forced to the edges of the brush, making uniform application of the paint very difficult.

Finally, there arises a need for an apparatus that the painter can use to soak his paintbrush in with water or solvent for cleaning purposes after the paintbrush has been used.

Several attempts have been made to try and solve some of the above mentioned problems. For example, U.S. Pat. Nos. 4,203,537 (McAlister 1980); 4,247,013 (O'Hori 1981) and Des. 305,820 (Beato 1990) disclose various horizontal straight wiping surface which can be used to unload excess paint off the paintbrush. The problem with these devices is that they only remove the paint off the mid section of the paintbrush. When the brush is placed against the straight surface, the paint is forced to the edges of the brush. Another problem with these devices is that they are not elevated off the surface of the paint can. brush. If he or she reinserts the brush to wipe the second side, the brush will reenter the paint in the can.

U.S. Pat. No. 4,203,537 shows a horizontal area where a painter can place a paintbrush. Although this is better than placing the brush on the can, it is not a suitable slot for painting accessories to be placed. If the paint can is moved, there is a very good chance that the paintbrush will fall off the device.

U.S. Pat. No. Des. 300,970 (Walker 1989) shows a paintbrush holder. The slot where the paintbrush is placed is very narrow at the top. Thus, the painter may have problems placing the brush in the device without dripping paint over the side of the device. Another problem with this device is the way it is held onto the can. An inward vertical surface holds the device to the inside of the can. This only defeats the purpose of the invention. When the device is removed from the can, paint residue will remain on the securing device and may drip onto surface areas.

OBJECTS AND ADVANTAGES

Accordingly, a need arises for a practical paint can device which can eliminate the problems described above. Several objects and advantages of the present invention are:

(a) to provide a device which is easily mounted and taken off of a paint can which has minimal surface area that comes into contact with paint;

(b) to provide a device which has an elevated wiping surface which is configured to keep paint out of the rim channel of the paint can when wiping a paintbrush on the device.

(c) to provide a device which has a wiping surface with a right angle on each side which leaves the paintbrush with a uniform coat of paint allowing uniform application of the paint;

(d) to provide a device which has a slidable area for a painter to place painting devices such as paintbrushes with an opening wide enough to allow easy placement of the painting devices;

(e) to provide a device which does not interfere with the carrying of the paint can when the ball is in the upright position;

(f) to provide a device which has a vertical surface which diverts paint residue, caused by the wiping of the paintbrush on the wiping surfaces, to flow back into the can;

(g) to provide a device which has a suitable area for soaking a paint brush after it has been used.

Further objects and advantages are to provide the painter with a device that helps eliminate messes and makes painting an easier job. The device also provides for efficient application of paint and allows the painter to cover more surface area because paint is applied more uniformly and not wasted in the rim of the paint can and over the side of the can.

DRAWING FIGURES

For a more complete understanding of the present invention and for further objects and advantages thereof, reference is now made to the following description taken in conjunction with the accompanying drawings in which.

REFERENCE NUMERALS IN DRAWINGS

| | | | |
|---|---|---|---|
| 10 | paintbrush wiper and apparatus holder | 12L | left outwardly projecting tang |
| 12R | right outwardly projecting tang | 14 | primary-horizontal wiping surface |
| 16L | left secondary wiping surface | 16R | right secondary wiping surface |
| 18 | vertical surface dam | 20L | left angled arm |
| 20R | right angled arm | 22 | curvilinear surface |
| 24 | horizontal stabilizing surface | 26 | apparatus holder |
| 28 | support rim | 30 | support ribs |
| 32 | paint can | 34 | studs |
| 36 | pivotally attached bail | 38 | circular opening |
| 40 | outer top edge | 42 | rim channel |
| 44 | inner bead | 46 | outside wall of lid insertion slot |
| 48 | paintbrush | | |

DESCRIPTION—FIGS. 1 to 5

Figure 1:
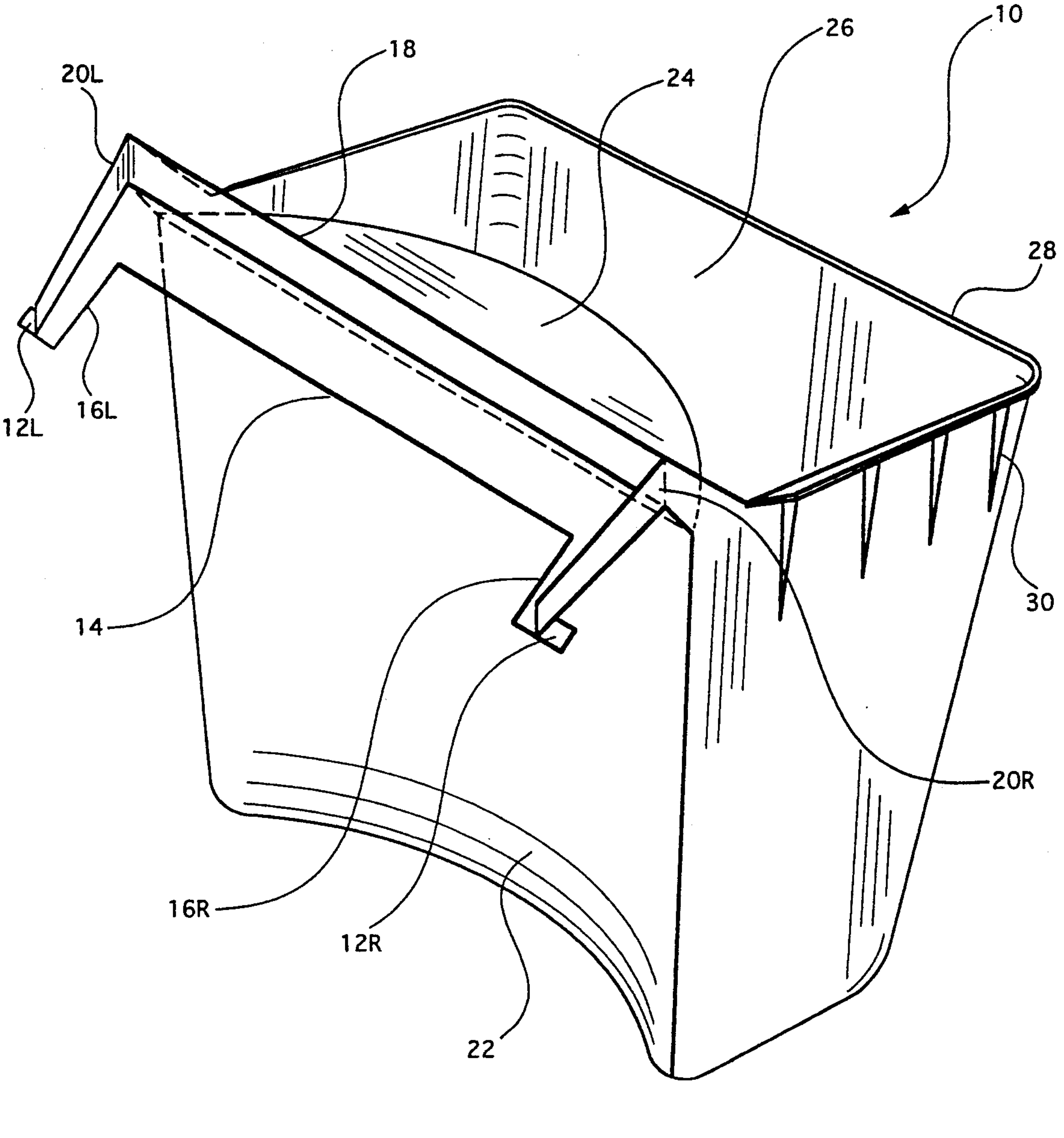
FIG. 1 is an isometric view of the present invention.

FIG. 1 illustrates the preferred embodiment of a paintbrush wiper and apparatus holder 10 which has two outwardly projecting tangs 12L and 12R designed to hold the present invention onto a conventional paint can. A primary-horizontal wiping surface 14 is used to divert excess paint into the opening of a paint can from the wiping action of a paintbrush on said wiping surface. Secondary wiping surfaces 16L and 16R oppositely disposed on each side of present invention are downwardly protruding surfaces used to wipe the bristles at the edges of a paintbrush, therefore forming an efficient painting formation on the paintbrush. A vertical surface dam 18 is used to divert any subsequent paint residue caused by the wiping action on primary wiping surface 14 to flow back into the paint can. Angled arms 20L and 20R protrude in a vertical downward configuration oppositely disposed on each side of present invention from the outer edges of dam 18. Angled arms 20L and 20R divert paint residue into the opening of the paint can. An apparatus holder 26, located behind a curvilinear surface 22 displays an opening at the top side of the preferred embodiment where a painting apparatus or tool of the like kind can be placed. Holder 26 is open at the top surface and closed on the sides, back and bottom of the present invention. The opening of holder 26 is significantly wider at the top, therefore causing the angle of the side and back walls to protrude inwardly at the bottom of holder 26. This allows for easy entrance of painting apparatuses and tools of the like kind. Support rim 28 is the rim around holder 26 which provides strength to the preferred embodiment 10. Support ribs 30 are downward projecting ribs from support rim 28 which also provide strength to for the preferred embodiment 10.

Figure 2:
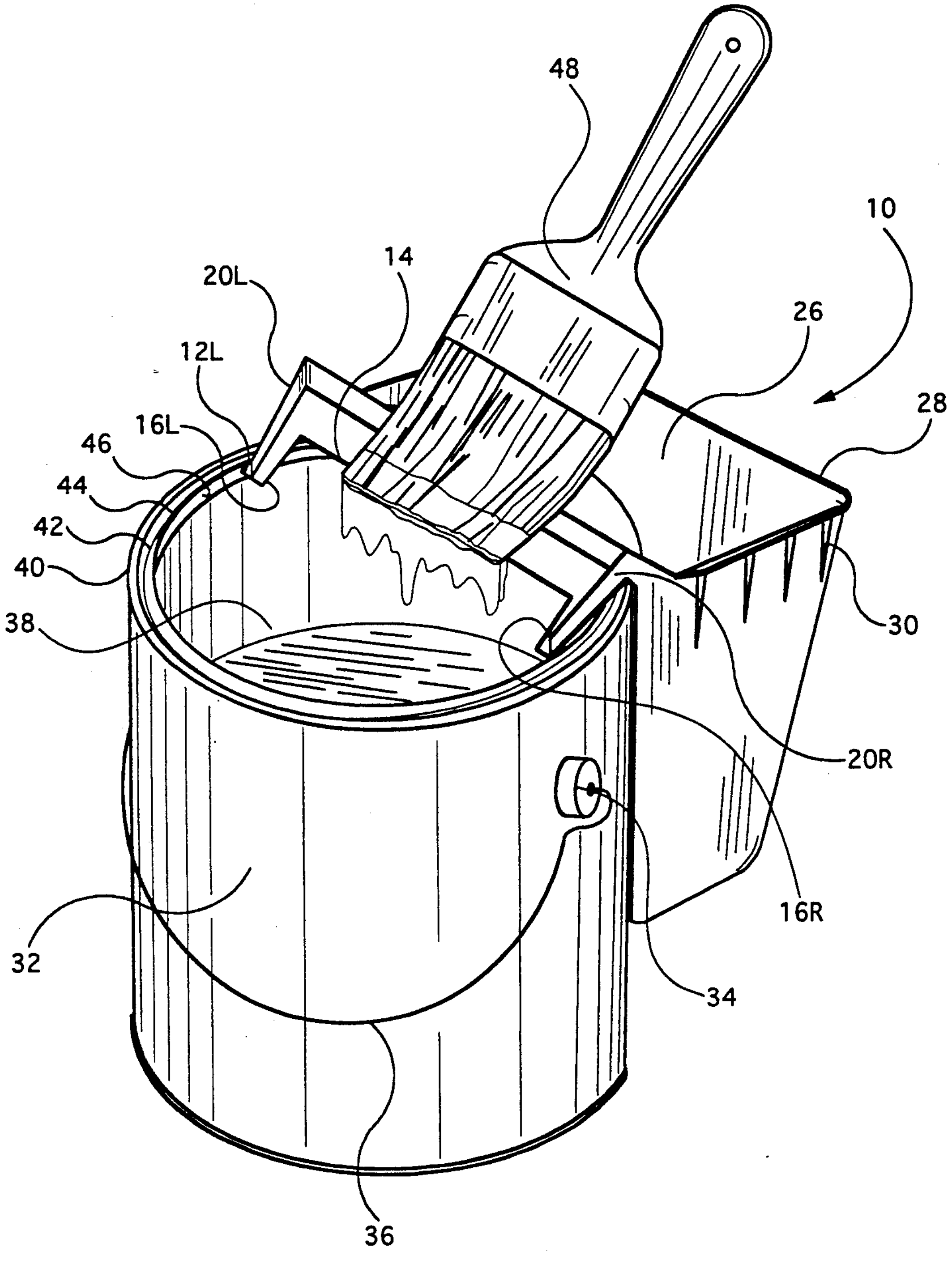
FIG. 2 is a perspective view of the present invention mounted on a conventional paint can showing the primary wiping surface in use.

FIG. 2 illustrates the preferred embodiment of a paintbrush wiper and apparatus holder 10 mounted on a conventional paint can 32 which is a cylindrically shaped metal container having a circular opening 38 at the topmost portion of the paint can 32 into which a paintbrush or other painting apparatus can be inserted. Two studs 34 oppositely on each side of the paint can project a pivotally attached bail 36 for transporting the paint container. Pivotally attached bail 36 does not come into contact with the present invention 10 in the upward carrying position. A paintbrush 48 shows the primary wiping surface 14 diverting paint back into the paint can. Dam 18 and arms 20L and 20R show the surfaces which divert paint, deposited on primary and secondary wiping surface 14 and 16L, 16R, back into the paint can. Primary wiping surface 14 is sufficiently wide to provide uniform scraping of wet paint from a paintbrush. The secondary wiping areas 16L and 16R form a clean edge on the sides of the paintbrush making a uniformly loaded paint brush. Secondary wiping areas 16L and 16R are necessary for extruding the paint which is forced to the sides of the paintbrush when wiped on primary wiping surface 14. Paintbrush 48 can be placed inside holder 26 when not in use. Holder 26 can also be used for soaking a paintbrush in water or solvent after usage.

Figure 3:
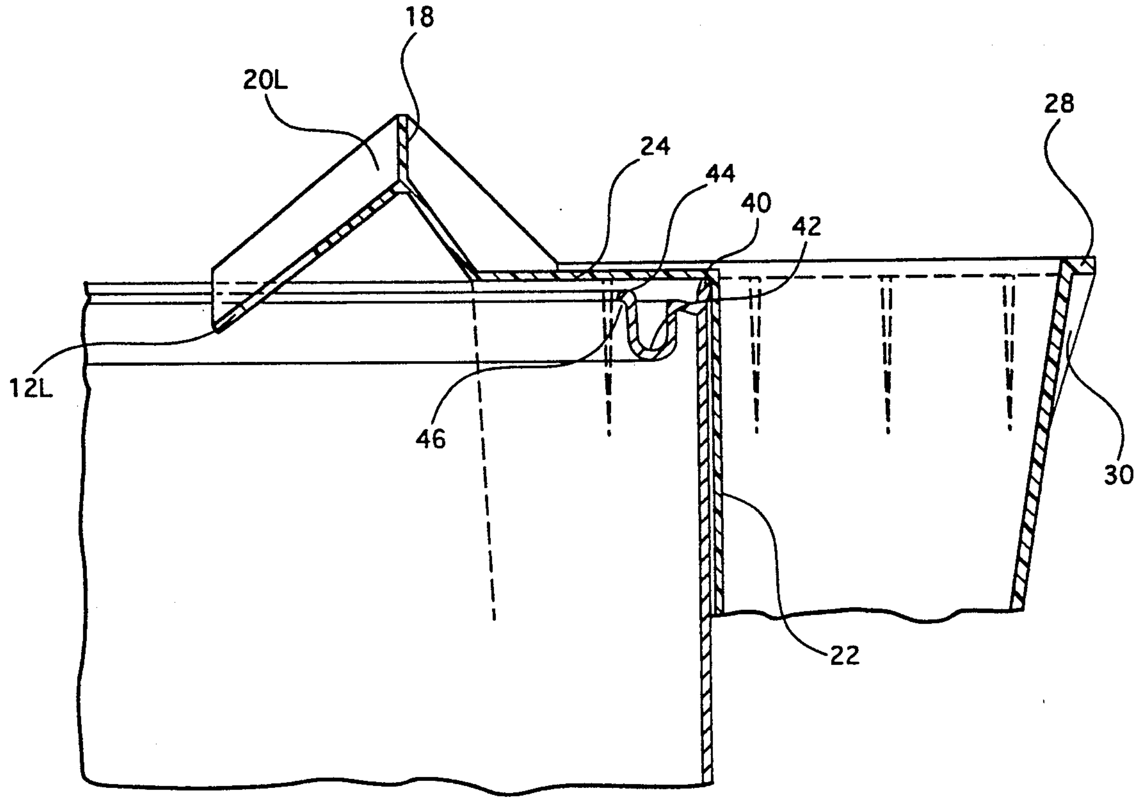
FIG. 3 is a cross sectional view of the present invention mounted on a conventional paint can.

FIG. 3 is a cross sectional view of the preferred embodiment 10 and conventional paint can 32. Outer top edge 40 of the paint can is the horizontal surface upon which the present invention rests. Curvilinear surface 22, best shown in FIG. 4, holds the present invention to the outer circular surface of the paint can. Inner bead 44 of the opening of the paint can and outside wall of lid insertion slot 46 hold the present invention to the can whereby two outwardly projecting tangs 12L and 12R are inserted. FIG. 3 depicts bead 44 of the inner opening of the can under which tangs 12L and 12R are secured.

Figure 4:
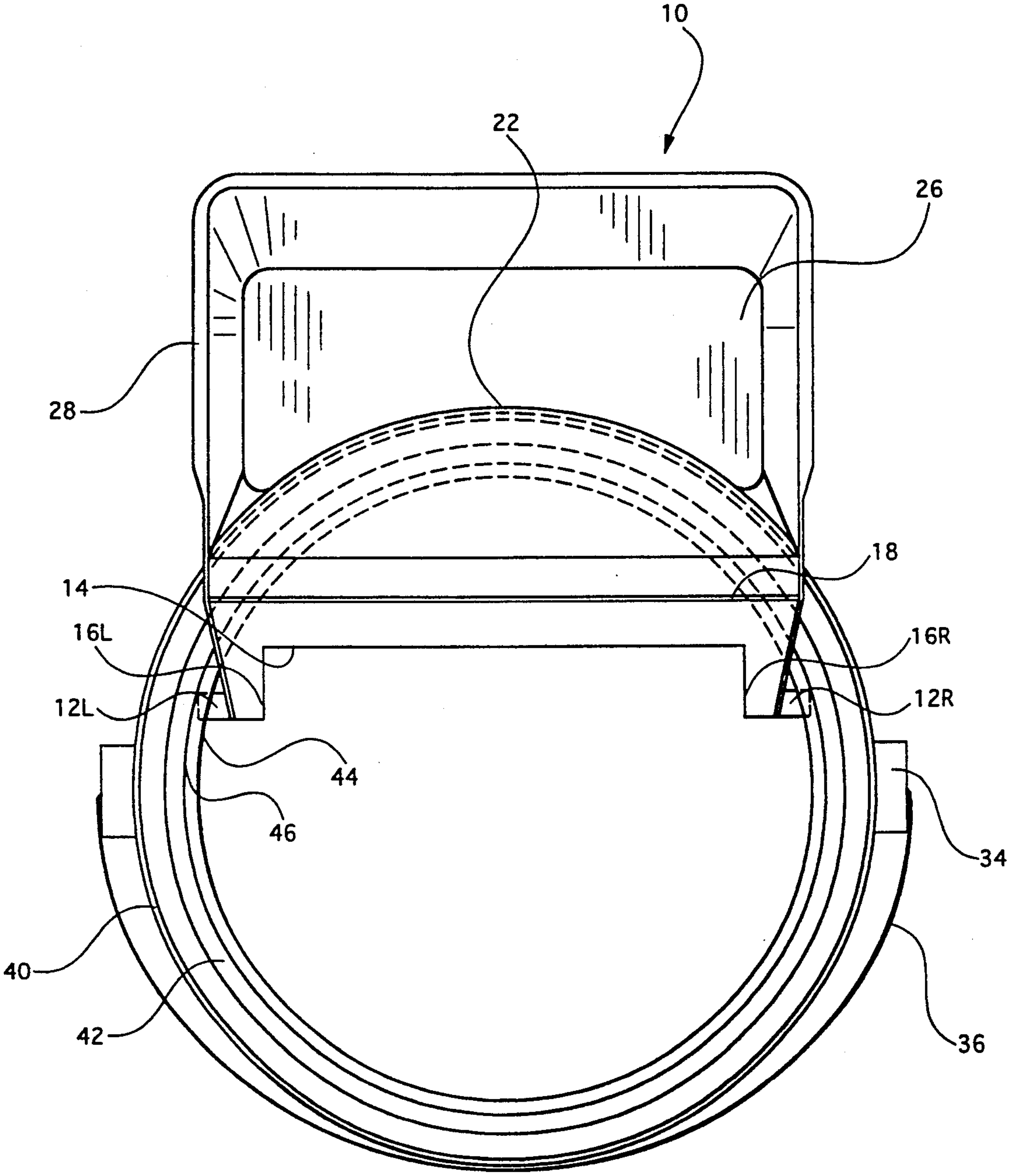
FIG. 4 is an overhead view of the present invention mounted on a conventional paint can.

As best seen in FIGS. 2-4, tangs 12L and 12R secure the present invention to the paint can by applying pressure to the under side of bead 44 of the inner opening of the can, and against lid insertion slot 46. Preferred embodiment is easily removed from the paint can by swinging bottom of holder 26 out from can 32 and lifting in an inward and upward motion. This action moves tangs 12L and 12R into the widest part of the paint can, releasing the pressure between tangs 12L and 12R, bead 44, lid insertion slot 46, and curvilinear surface 22 best seen in FIG. 4.

A horizontal stabilizing surface 24 best illustrated in FIGS. 1,4 is the horizontal surface at the top of curvilinear surface 22. Surface 24 acts as a stabilizer on the outer top edge 40 of the paint can. Arms 20L and 20R are supports which stabilize the wiping surface 14 and tangs 12L and 12R. Arms 20L and 20R also act as paint diverters. If any paint residue passes over the dam 18, arms 20L and 20R divert the paint into holder 26 so as not to run into the rim channel 42 and down the sides of the paint can or onto the floor.

Figure 5:
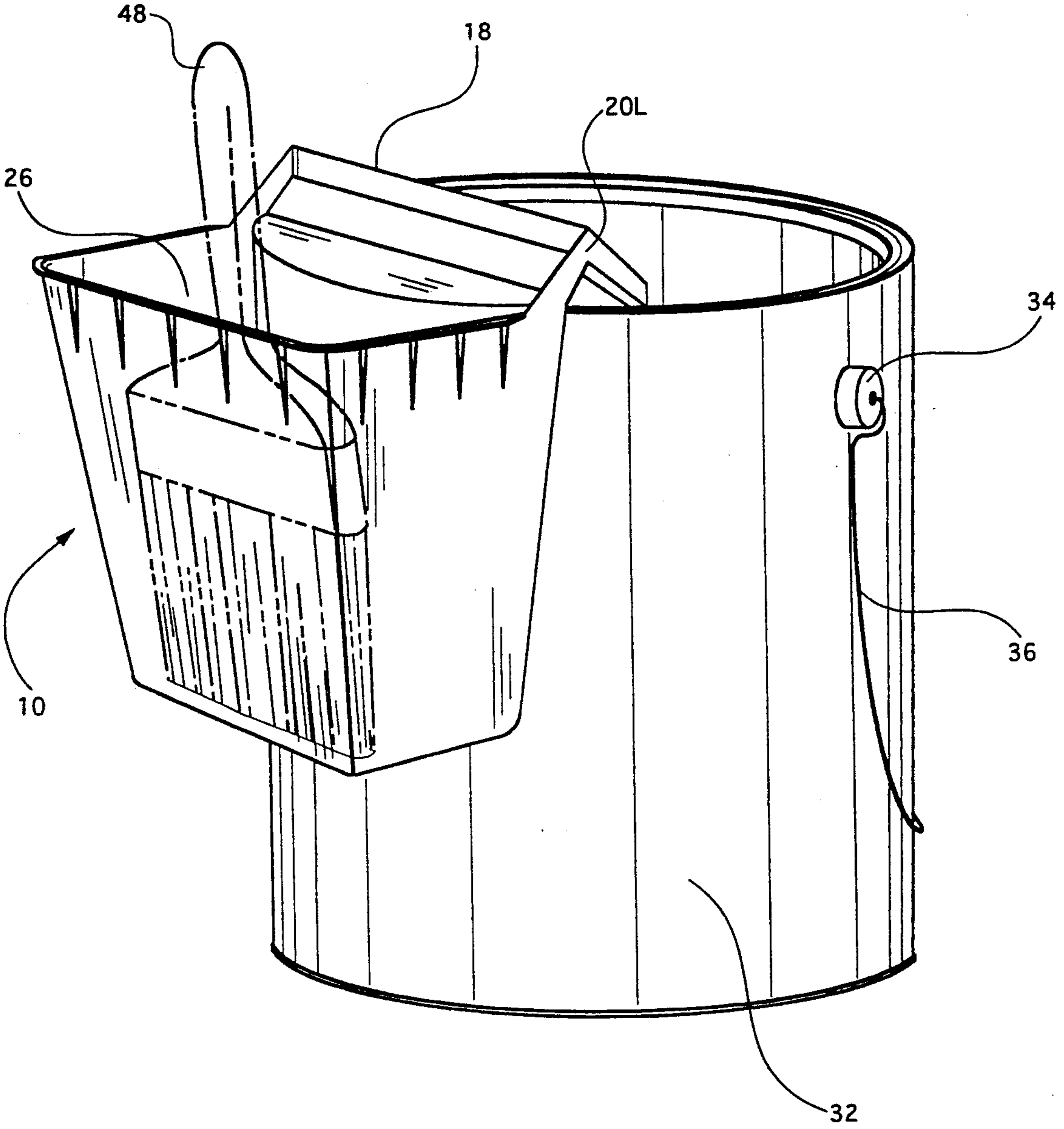
FIG. 5 is a perspective view of the present invention mounted on a conventional paint can with a paintbrush resting in the apparatus holder.

FIG. 5 best illustrates holder 26 in use. Paintbrush 48 is easily placed into the holder 26, and easily removed from the holder 26 due to the wide opening at the top of holder 26.

OPERATION—FIGS. 2, 5

Using the paintbrush wiper and apparatus holder 10 in conjunction with a conventional paint can 32 is a very simple process. To mount the preferred embodiment, one first should grasp preferred embodiment 10 by back side of holder 26 (distant side of holder 26 from surface 22). Next, one moves the tangs 12L and 12R into the widest portion of circular opening 38 at an inward angle to the paint can. Once tangs 12L and 12R are in circular opening 38 and below inner bead 44 of paint can, preferred embodiment is tilted down onto paint can. This action causes preferred embodiment to mount snugly on the paint can. To remove the preferred embodiment 10 one should swing the bottom of holder 26 out from can 32 and lift in an inward and upward motion, moving tangs 12L and 12R into widest portion of the paint can 32.

FIG. 2 best illustrates paintbrush 48 wiping against primary horizontal wiping surface 14. This action unloads excess paint on the wide portion of the brush bristles. Brush 48 should then be wiped on secondary wiping surfaces 16L and 16R to wipe excess paint off the sides of brush 48. This action gives paintbrush 48 evenly loaded bristles, thus allowing even application of paint.

FIG. 5 shows the preferred embodiment 10 with paintbrush 48 in holder 26. Holder 26 is used to hold a paintbrush or painting apparatus of the like kind when not in use. When the painting job is finished the preferred embodiment 10 can be used to soak the paintbrush by filling holder 26 with water or solvent and placing the paintbrush inside.

SUMMARY, RAMIFICATIONS, AND SCOPE

Accordingly, the reader will see that the paintbrush wiper and apparatus holder is a useful device which is easily attached to a conventional paint can. In addition, the preferred embodiment is useful in producing an efficient formation on the bristles of a paintbrush for even application of paint, as well as an apparatus holder. Specifically the invention:

- provides a painter with a surface for wiping excess paint off a paintbrush on the wide side of the brush and the sides of the brush (double-action wiping process);
- permits a painter to paint in a cleaner manner reducing the risk of getting paint in the rim channel of the paint can, over the side of the paint can, and onto the floor or undesirable surfaces;
- provides a painter with an area to place a paintbrush or painting apparatus of the like kind when not in use.
- provides a painter with an area for soaking a paintbrush after the paintbrush has been used.

Although the description above contains many specificities, these should not be construed as limiting the scope of the invention. Thus, the scope of the invention should be determined by the appended claims and their legal equivalents, rather than by the examples given.

I claim:

1. A paintbrush wiper and apparatus holder designed to be removably mounted to the upper rim of a conventional circular paint can, comprising:

- a pair of opposing angled arms attached to said apparatus holder and extending therefrom, each with an outwardly extending tang, located at an end remote from the apparatus holder, for mounting engagement under the upper rim of and inside of said 1 paint can;
- a linear, horizontal wiping surface interconnecting said angled arms;
- a pair of opposing secondary wiping surfaces extending from said angled arms and said horizontal wiping surface, each secondary wiping surface extending towards said opposing secondary wiping surface;
- said wiping surfaces angled downwardly towards the paint can interior to facilitate the dripping of paint into said paint can;
- a dam extending upward above said wiping surfaces;
- an apparatus holder, having a compartment for holding paint tools, conforming to the circular outer wall of said paint can, and lying adjacent said outer wall when mounted thereto.

2. The paintbrush wiper and apparatus holder as defined in claim 1 wherein the wiping surfaces are angled in such a manner and the apparatus holder is connected in a position adjacent thereto to prevent paint from entering the rim channel of the paint can.

3. The paintbrush wiper and apparatus holder as defined in claim 1 wherein the apparatus when mounted on a paint can having a bail will not interfere with use of said bail in an upright position.

4. The paintbrush wiper and apparatus holder as defined in claim 1 wherein said paintbrush wiper and apparatus holder is made of low density polyethylene or polypropylene to prevent paints from adhering to the surface thereof.

5. The paintbrush wiper and apparatus holder as defined in claim 1 wherein the apparatus holder has a support rim around the extended upper surface of said apparatus holder with a plurality of support ribs extending downward from said rim.

6. The paintbrush wiper and apparatus holder as defined in claim 1 whereby said apparatus holder is a means to soak and rinse a paint brush with water or solvent.

* * * * *